United States Patent Office 3,641,141
Patented Feb. 8, 1972

3,641,141
PROCESS FOR THE PREPARATION OF ALKYL-THIONO-PHOSPHONIC ACID DICHLORIDES
Hanshelmut Schlör, Wuppertal-Elberfeld, Germany, assignor to Farbenfabriken Bayer Aktiengesellschaft, Leverkusen, Germany
No Drawing. Filed Nov. 1, 1968, Ser. No. 772,818
Claims priority, application Germany, Nov. 21, 1967,
P 16 68 043.6
Int. Cl. C07f 9/42
U.S. Cl. 260—543 P                14 Claims

ABSTRACT OF THE DISCLOSURE

Reacting dialkyl disulfide as sulfur donor in the presence of alkali metal- or ammonium-chloride with the Clay-Kinnear-Perren complex [alkyl-$PCl_3$]$^+$[$AlCl_3X$]$^-$, in which X is chlorine or bromine, formed from alkyl-chloride or alkylbromide, phosphorus trichloride and aluminium trichloride to produce alkyl-thiono-phosphonic acid dichloride, in which the alkyl radical is based upon the corresponding starting alkyl-chloride, said produced dichloride being recoverable from the reaction mixture by distillation, e.g. at about 190–220° C.; such alkyl-thiono-phosphonic acid dichlorides being known intermediates for the preparation of insecticidal thionophosphonic acid esters.

---

The present invention relates to and has for its objects the provision for particular new methods of producing certain known alkyl-thiono-phosphonic acid dichlorides which are known intermediates for preparing insecticides, e.g. in a simple overall reaction, using readily available starting materials whereby to attain outstanding yields, with other and further objects of the invention becoming apparent from a study of the within specification and accompanying examples.

These known alkyl-thiono-phosphonic acid dichloride compounds have the general formula:

in which R is a, preferably lower, alkyl radical.

Algyl-thiono-phosphonic acid dichlorides are already known from the literature. Their preparation has hitherto been effected mostly by sulfurization of alkyl-phosphonic acid dichlorides with phosphorus pentasulfide: M. I. Kabachnik and N. M. Godovikov [Reports of the Academy of Sciences of the USSR, 110, 217–219 (1956)]. The thiono compounds are obtained in about 50 to 75% yield according to the following equation:

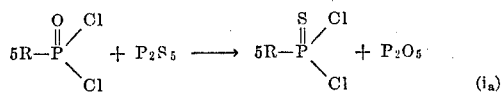

The alkyl-phosphonic acid dichlorides used as intermediates in the above method are also prepared according to known processes, the three most important of which are:

(a) Halogenation of alkyl-phosphonic acid dialkyl esters (obtainable according to the Arbusov or Michaelis-Becker reaction) by means of phosphorus pentachloride or thionyl chloride.

(b) (Specifically for the preparation of methyl-phosphonic acid dichloride) thermal decomposition of dimethyl-phosphite and halogenation of the resultant methyl-pyrophosphonic acid with thionyl chloride:

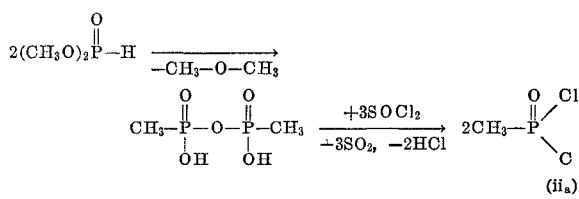

(c) The method of J. P. Clay [J. Org. Chem. 16, 892 (1951)] and A. M. Kinnear and B. A. Perren [Soc. 1952, 3437]. This process based on the addition of alkyl chloride and phosphorus trichloride to aluminium chloride yields, via the complex

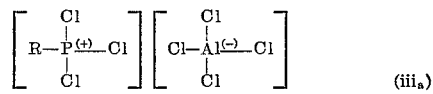

and subsequent hydrolysis, alkyl-phosphonic acid dichlorides in good yields:

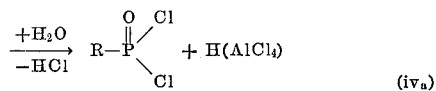

This method has given good results in particular for the preparation of ethyl- and isopropyl-phosphonic acid dichloride.

Finally alkyl-thiono-phosphonic acid dichlorides are readily obtainable in a direct manner without isolation of the corresponding sulfur-free compounds from the Clay-Kinnear-Perren complex formulated above by heating this complex in the presence of alkali metal chloride, preferably potassium or ammonium chloride, with sulfur, or, better still, with ethylmercaptan. K. W. Karavanov and S. Z. Ivin (J. obsc. Chim. 35, 1 (1965)) describe the latter reaction which, with regard to the control of the temperature, can be divided into two sections, as follows:

1) [R—$PCl_3$]$^{(+)}$[$AlCl_4$]$^{(-)}$ + $C_2H_5$—SH    (30 to 60°C.)

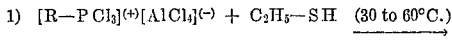

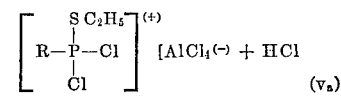

2) 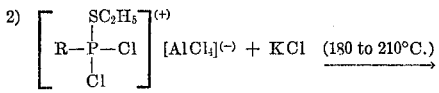

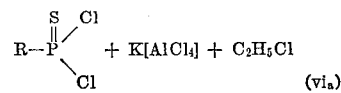

This so-called ethylmercaptan method (d) is suitable in particular for the preparation of ethyl-thionophosphonic acid dichloride. However, the toxicity, the relatively high price, the ready volatility and the fire hazard caused thereby as well as the repugnant odor of the ethylmercaptan and the ventilation problems associated therewith hinder the industrial practice of this method.

If, instead of ethylmercaptan, sulfur or other solid or crystalline sulfur donors are used for method (d) [for example potassium thiocyanate], other disadvantages have to be accepted. The distribution of sulfur in the reaction mixture and the stirrability of the mixture even at higher temperatures are unsatisfactory. Also, the reactivity of the sulfur is lower than that of ethylmercaptan and, accordingly, the yields of alkyl-thiono-phosphonic acid dichloride are poorer.

It has now been found in accordance with the present invention that a versatile and smooth process for the production of alkyl-thiono-phosphonic acid dichlorides in favorable yields and high purity may now be provided, and the above-mentioned disadvantages can be avoided, when, instead of ethylmercaptan, a lower dialkyl disulfide is used as sulfur donor. In this way the desired alkyl-thiono-phosphonic acid dichlorides are obtained in good yield and purity, i.e. safely and inexpensively.

The invention accordingly provides a process for the production of an alkyl-thiono-phosphonic acid dichloride of Formula I$a$ above in which the complex compound formed from alkylchloride or alkylbromide, phosphorus trichloride and aluminium chloride is heated with a lower alkyl disulfide as sulfur donor in the presence of alkali metal chloride (e.g. NaCl, KCl, etc.) or ammonium chloride.

The heating may take place at internal temperatures substantially between about 40–220° C. At internal temperatures substantially between about 190–220° C. the product may be recovered by distillation.

The reaction can be carried out conveniently as "one-pot process" as follows:

(a) Alkyl halide is introduced with vigorous stirring or is added dropwise to a mixture of aluminium chloride and phosphorus trichloride, e.g. at an internal temperature substantially between about 0–75° C., preferably between about 0–30° C., and the ingredients reacted at an internal temperature within such range. The following reaction occurs:

$$AlCl_3 + PCl_3 + RX \rightarrow [R\text{---}PCl_3]^{(+)}[AlCl_3X]^{(-)} \quad (iii_a)$$

In this equation R has the same meaning as given above and X stands for chlorine or bromine, preferably for chlorine. (b) Alkali metal chloride or ammonium chloride is then added to the Clay-Kinnear-Perren complex obtained according to (a), and dialkyl disulfide is subsequently added at temperatures substantially between 40–90° C., preferably at 50–60° C. Methylene chloride may be included optionally as a diluent. After 1 to 2 hours reaction time the temperature of the mixture is increased to 190 to 220° C., for example to about 200° C. in order to complete the reaction. At the last mentioned temperatures the alkyl-thiono-phosphonic acid dichloride is distilled off.

On the basis of the experimental results hitherto obtained, it seems that the following reactions take place:

(1) $2[R\text{---}PCl_3]^{(+)}[AlCl_3X]^{(-)} + 2CH_3\text{---}S\text{---}S\text{---}CH_3 \longrightarrow$

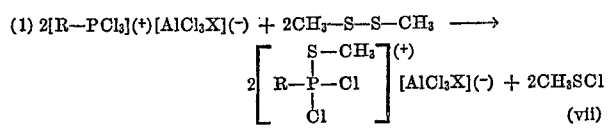
(vii)

(2) $[R\text{---}PCl_3]^{(+)}[AlCl_3X]^{(-)} + 2CH_3SCl \longrightarrow$

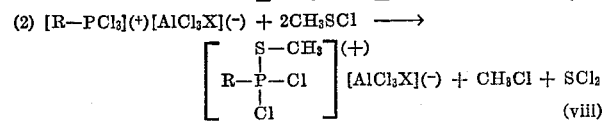
(viii)

(3) 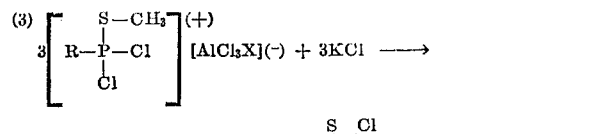

(ix)

In summary, therefore, the following equation would result:

$3[R\text{---}PCl_3]^{(+)}[AlCl_3X]^{(-)} + 2CH_3\text{---}S\text{---}S\text{---}CH_3 + 3KCl \longrightarrow$

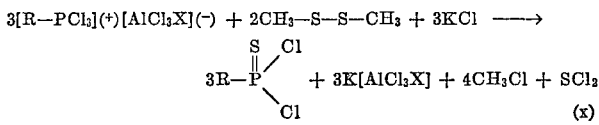
(x)

The experimental results agree with the above reaction schemes.

Advantageously, in accordance with the present invention, in the various formulae herein:

R represents straight and branched alkyl, especially having 1–5, or 1–4, or 1–3 carbon atoms and more especially lower alkyl such as methyl, ethyl, n- and iso-propyl, n-, iso-, sec.- and tert.- butyl, amyl, and the like, particularly $C_{1-5}$ or $C_{1-4}$ or $C_{1-3}$ alkyl; and X represents chlorine or bromine, preferably chlorine.

The dialkyl disulfides usable herein, include straight and branched di lower alkyl, especially di $C_{1-4}$ alkyl, such as di- methyl, ethyl, n-propyl, isopropyl, n-butyl, isobutyl, sec.-butyl, tert.-butyl, etc., -disulfides.

In the case of numerous mixtures, it emerged that maximum yields of alkyl-thiono-phosphonic acid dichloride are obtained when about 0.6 to 0.8 mol of dialkyl disulfide, preferably dimethyl disulfide, are used per mol of complex compound. This can be seen from the following table; as example, the preparation of ethyl-thiono-phosphonic acid dichloride was chosen.

Number of mols used of dimethyl disulfide per mol of complex compound

|  | 0.5 | 0.55 | 0.6 | 0.75 | 1 | 2 |
|---|---|---|---|---|---|---|
| Yield of  (I$a$) in percent | 49 | 55 | 68 | 86 | 52 | 27 |

In the same way, at least the stoichiometrical amount of the alkali metal- or ammonium-chloride is used based on the amount of the complex compound present.

From the above information, it can be clearly seen that the use of dimethyl disulfide which, compared to ethylmercaptan, is relatively not readily volatile and little toxic, leads to an elegant, technologically readily performable and economically favorable synthesis of alkyl-thionophosphonic acid dichlorides.

The purity of the end products was verified by the analysis results and thin-layer comparative chromatograms.

The alkyl-thiono-phosphonic acid dichlorides obtainable according to the process of the present invention are valuable intermediate products for the production of insecticidal thionophosphoric acid esters (see for example German Pat. 1,099,530).

The following examples illustrate, without limitation, the production process of the present invention.

EXAMPLE 1

$$C_2H_5\text{---}\overset{\overset{S}{\|}}{P}\overset{Cl}{\diagdown}_{Cl} \quad (Ia)$$

Ethyl chloride is introduced in a vigorous gas stream at about 0 to 25° C., with vigorous stirring and external cooling, into a mixture of 670 g. aluminum chloride and 700 g. phosphorus trichloride (in each case about 5 mols). After about 400 g. (6.2 mols) of ethyl chloride have been introduced, the reaction mixture is stirred for a further 3 to 5 hours, without cooling, until complete dissolving has taken place. After this, the mixture is diluted with 200 ml. methylene chloride; 372 g. (5 mols) dry, powdered potassium chloride [or 268 g. (5 mols) ammonium chloride] are introduced in the course of 10 minutes, with stirring, and 353 g. (3.75 mols) dimethyl disulfide are caused to run in as a thin jet within a further 10 minutes. The reaction proceeds slightly exothermally; external cooling is not required. The mixture is then heated under reflux for 2 hours; the internal temperature reaches 50 to 60° C. After this, the reflux condenser is replaced by a descending condenser and the mixture is heated within 2½ hours, with vigorous stirring, to an internal temperature of 190 to 220° C. (bath temperature up to 240° C.). The distillates which come over from an internal temperature of 100° C. onwards are collected and the crude distillates are fractionally distilled. 705 g. (4.32 mols) ethyl-thiono-phosphonic acid dichloride of B.P. 56 to 60° C./12 mm. Hg are obtained.

Instead of 400 g. ethyl chloride 600 g. (5.5 mols) ethyl bromide may be used as starting material.

The yield is 86% of the theory, with reference to phosphorus trichloride, aluminum chloride and potassium chloride.

*Analysis.*—C₂H₅Cl₂PS (molecular weight 163). Calculated (percent): P, 19.01; S, 19.63; Cl, 43.6. Found (percent): P, 18.91; S, 19.53; Cl, 43.7.

The compound possesses a uniform thin-layer chromatogram.

EXAMPLE 2

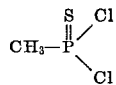

(2a)

1068 g. (8 mols) aluminum chloride and 1100 g. (8 mols) phosphorus trichloride are introduced into a 4-liter flask with stirrer and reflux condenser. At an internal temperature of 75° C. (oil-bath temperature 90° C.), methyl chloride is then introduced into the mixture. After about three hours vigorous introduction, a clear solution has formed. The mixture is stirred for a further hour; the reflux condenser is then replaced by a descending Liebig condenser and the mixture is heated to an internal temperature of 110° C. Excess (not complex-bound) phosphorus trichloride is distilled off. 160 g. phosphorus trichloride are recovered; 940 g. (6.84 mols) phosphorus trichloride have therefore reacted. The reaction mixture is allowed to cool to 90° C.; 300 ml. methylene chloride are added to it, with stirring, 596 g. (8 mols) of potassium chloride are then introduced and 483 g. (5.13 mols) of dimethyl disulfide are added dropwise to the mixture in the course of one hour, without external supply of heat, in such a manner that the internal temperature of the mixture does not exceed 80° C. The mixture is then cautiously heated until after 2½ hours an internal temperature of 200° C. is reached. This temperature is maintained for a further hour. The liquid distilling off above an internal temperature of 100° C. is collected and again distilled. 706 g. (4.74 mols) of methyl-thiono-phosphonic acid dichloride of B.P. 42 to 43° C./11 mm. Hg are obtained.

The yield is 69.5% of the theory, with reference to reacted phosphorus trichloride.

In the gas chromatogram, 96% of pure product and 2.5% of phosphorus sulfochloride are determined.

*Analysis.*—CH₃Cl₂PS (molecular weight 149). Calculated (percent): S, 21.50; Cl, 47.6. Found (percent): S, 21.31; Cl, 48.3.

EXAMPLE 3

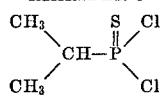

(3a)

The appropriate complex compound is prepared in the manner described in Example 1 from phosphorus trichloride, aluminum chloride and isopropyl chloride. To 2.5 mols of the complex compound there are added successively 100 ml. methylene chloride and 186 g. (2.5 mols) potassium chloride. After the addition of 188 g. (2 mols) dimethyl disulfide, the procedure stated in Example 1 is followed. 208 g. (1.175 mols) of isopropyl-thiono-phosphonic acid dichloride (B.P. 71 to 75° C./16 mm. Hg) are obtained.

The yield is 47% of the theory.

It will be appreciated that the instant specification and examples are set forth by way of illustration and not limitation, and that various modifications and changes may be made without departing from the spirit and scope of the present invention.

What is claimed is:

1. In the production of alkyl-thiono-phosphonic acid dichloride of the formula

in which R is alkyl wherein a complex compound formed from an alkyl halide of the formula R–X in which R is the same as defined above and X stands for a member selected from the group consisting of chlorine and bromine, phosphorus trichloride and aluminum chloride, is reacted with a sulfur donor in the presence of a chloride member selected from the group consisting of alkali metal chloride and ammonium chloride to produce the corresponding alkyl-thiono-phosphonic acid dichloride, the improvement which consists essentially of using a di-lower alkyl disulfide as said sulfur donor.

2. Process according to claim 1 wherein the produced alkyl-thiono-phosphonic acid dichloride is recovered from the reaction mixture by distillation.

3. Process according to claim 2 wherein said distillation is carried out at an internal temperature substantially between about 190–220° C.

4. Process according to claim 1 wherein the reaction is carried out using substantially between about 0.6–0.8 mol of the di lower alkyl disulfide per mol of said complex compound.

5. Process according to claim 1 wherein the reaction is carried out using dimethyl disulfide as the di lower alkyl disulfide.

6. Process according to claim 1 wherein the reaction is carried out using potassium chloride as said chloride member.

7. Process according to claim 1 wherein the reaction is carried out using ammonium chloride as said chloride member.

8. Process according to claim 1 wherein R is lower alkyl and said complex compound has the formula [R—PCl₃]⁺[AlCl₄]⁻ in which R is the same as defined above.

9. Process according to claim 1 wherein said alkyl halide, phosphorus trichloride and aluminum chloride are reacted to form a complex compound of the formula [R—PCl₃]⁺[AlCl₃X]⁻ in which R and X are the same as defined above, thereafter said chloride member is added thereto followed by said di lower alkyl disulfide, and the resulting mixture is heated to produce the corresponding alkyl-thiono-phosphonic acid dichloride.

10. Process according to claim 9 wherein said alkyl halide is introduced into a mixture of aluminum chloride and phosphorus trichloride at an internal temperature substantially between about 0–75° C. and the resulting mixture reacted at an internal temperature within the range of 40–220° C.

11. Process according to claim 9 wherein said complex compound and said di lower alkyl disulfide are heated in the presence of said chloride member initially at an internal temperature substantially between about 40–90° C. and thereafter at an internal temperature substantially between about 190–220° C. to complete the reaction.

12. Process according to claim 1 for the production of $C_{1-5}$ alkyl-thiono-phosphonic acid dichloride of the formula

in which R is $C_{1-5}$ alkyl which comprises heating a complex compound of the formula $[R—PCl_3]^+[AlCl_4]^-$ in which R is the same as defined above, with a di $C_{1-4}$ alkyl disulfide as sulfur donor in the presence of a chloride member selected from the group consisting of alkali metal chloride and ammonium chloride, at an internal temperature substantially between about 40–220° C. to produce the corresponding $C_{1-5}$ alkyl-thiono-phosphonic acid dichloride, and recovering said acid dichloride as distillate.

13. Process according to claim 12 wherein said di $C_{1-4}$ alkyl disulfide is used in an amount substantially between about 0.6–0.8 mol per mol of said complex compound.

14. Process according to claim 12 for the production of alkyl-thiono-phosphonic acid dichloride of the formula

in which R is $C_1$–$C_3$ alkyl which comprises heating a complex compound of the formula $[R—PCl_3]^+[AlCl_4]^-$ in which R is the same as defined above, with a di $C_{1-4}$ alkyl disulfide as sulfur donor in the presence of a chloride member selected from the group consisting of alkali metal chloride and ammonium chloride, at an internal temperature substantially between about 40–220° C. to produce the corresponding $C_{1-3}$ alkyl-thiono-phosphonic acid dichloride, and recovering said acid dichloride as distillate.

References Cited

Reid, Org. Chem of Bivalent Sulfur vol. 3, pp. 369–370. Chem. Publishing Co., Inc. New York, N.Y.

Karavanov, J., General Chem. USSR, vol. 35 #4 pp. 736–7 and vol. 35 #1, pp. 76–7 (1965).

LORRAINE A. WEINBERGER, Primary Examiner

E. J. GLEIMAN, Assistant Examiner